Nov. 11, 1952     R. HAWVER ET AL     2,617,681
CONVERTIBLE TOP

Filed Aug. 26, 1950     3 Sheets-Sheet 1

R. HAWVER
R. F. VELTEN
INVENTORS

BY E. C. McRae
J. R. Faulkner
G. H. Oster

ATTORNEYS

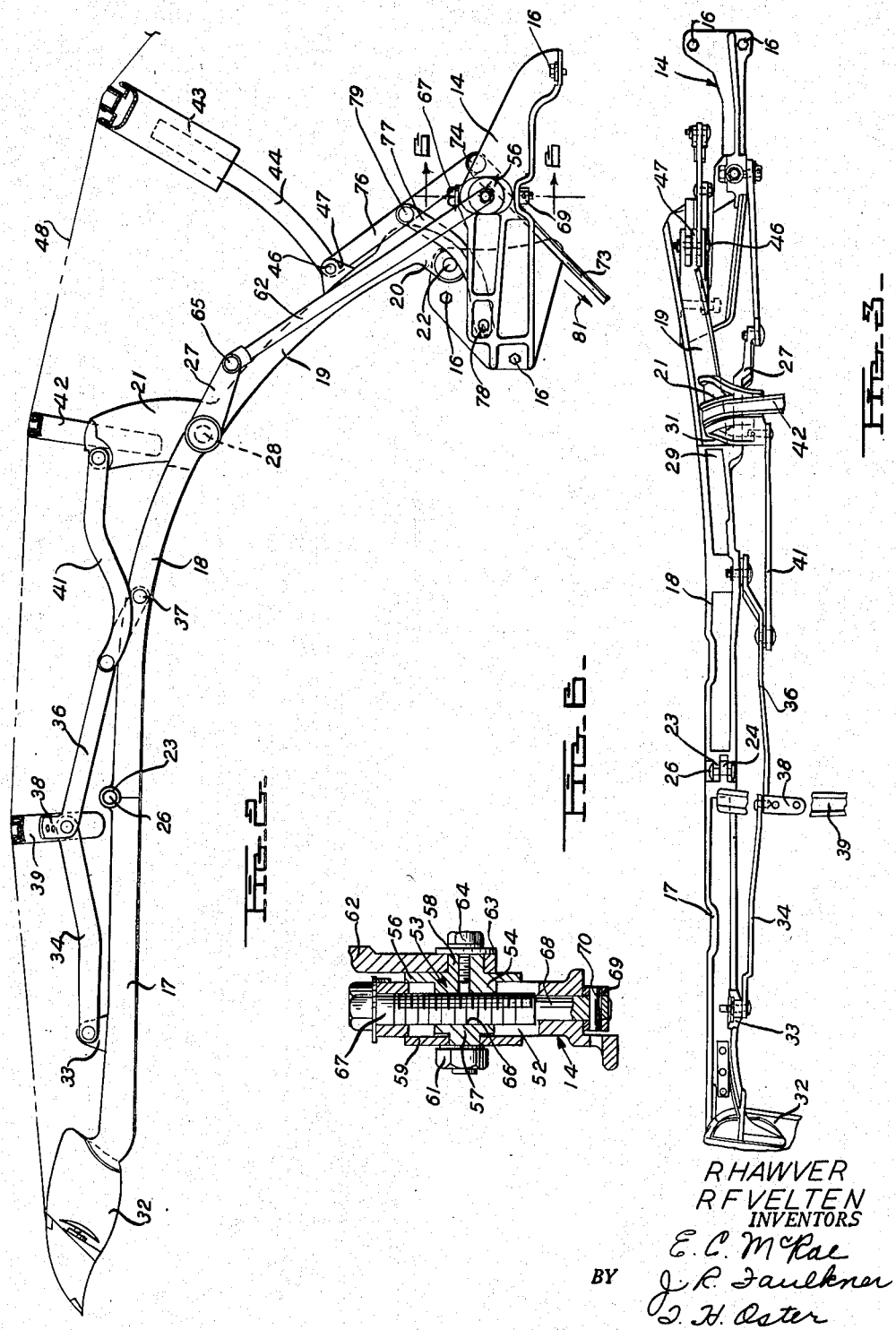

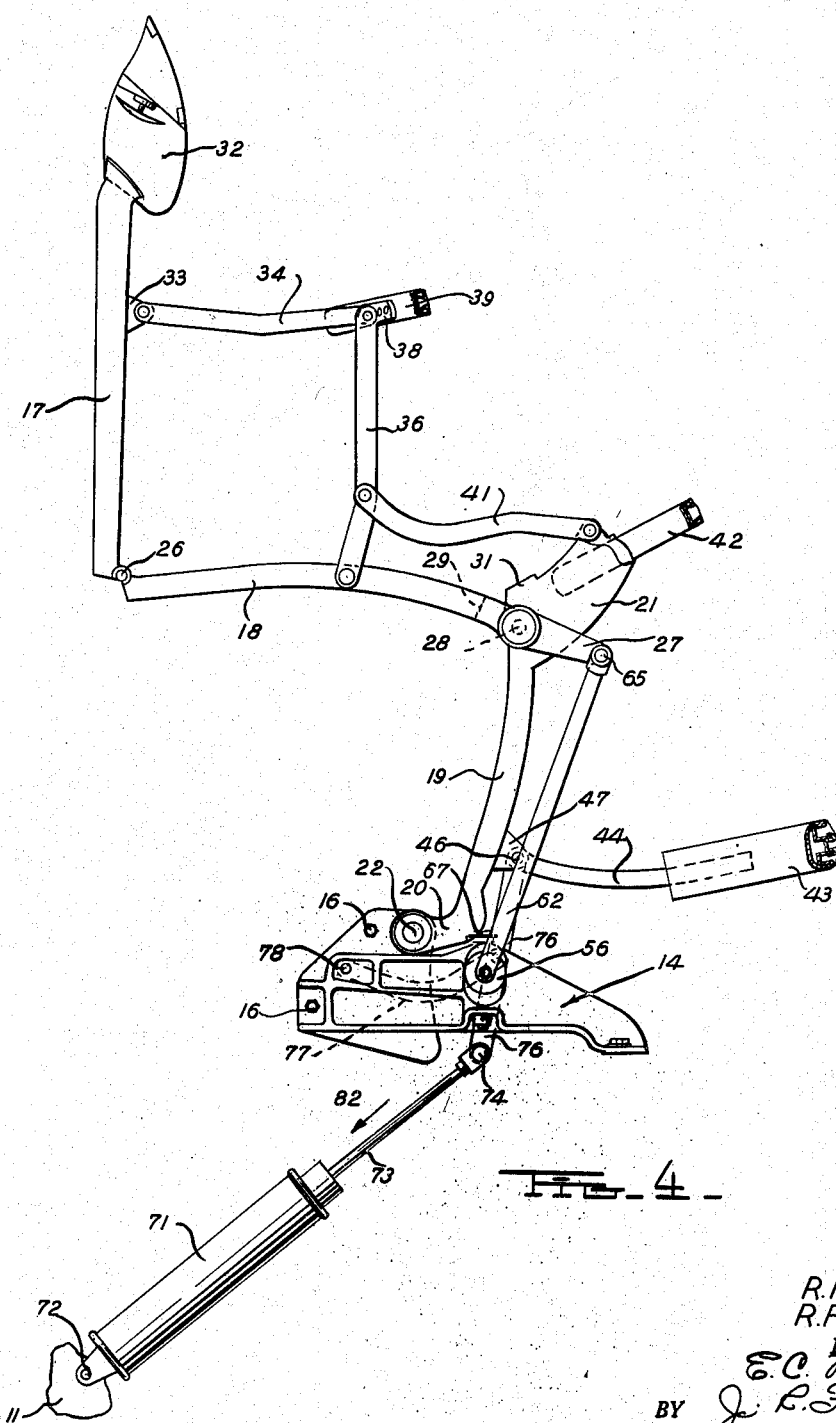

Patented Nov. 11, 1952

2,617,681

UNITED STATES PATENT OFFICE 2,617,681

CONVERTIBLE TOP

Roy Hawver, Birmingham, and Richard F. Velten, Detroit, Mich., assignors to Ford Motor Company, Dearborn, Mich., a corporation of Delaware Application August 26, 1950, Serial No. 181,662

7 Claims. (Cl. 296—117)

This invention relates to a foldable top for a motor vehicle.

An object of the present invention is to provide a foldable top for a motor vehicle having a convertible type body in which the power for raising and lowering the top is applied in such manner as to smoothly and efficiently effect the operation thereof, and to accomplish this result with fewer movable parts than in conventional folding top constructions. A further object is to provide a construction in which the mechanical advantage of the power application remains at a high level throughout the entire cycle of operation between the raised and lowered positions of the top. This is accomplished in the present invention by providing a construction in which a power link is pivotally connected at its upper end to an intermediate portion of the rear side rail and at its lower end is connected to the hydraulic power cylinder. Intermediate its end the power link is fulcrumed about a movable fulcrum point provided by a swinging strut the lower end of which is pivotally connected to the fixed supporting bracket and the upper end of which is pivotally connected to an intermediate portion of the power link. The power link is arranged substantially at right angles to the strut in the raised position of the top and the power cylinder is likewise arranged generally perpendicular to the power link at the beginning of the lowering operation. Initial power application during the lowering operation swings the power link about its fulcrum resulting in a powerful turning couple or torque application to the rear side rail. As the top is lowered, the fulcrum strut swings so that an advantageous power application and mechanical advantage prevails throughout the cycle.

Another object of the present invention is to provide a foldable top structure for a motor vehicle in which readily accessible means are provided for adjusting the linkage to compensate for manufacturing variations and to take up play and lost motion which may result after operation of the vehicle. To this end a balance link is provided having its lower end pivotally connected to the supporting bracket and its upper end pivotally connected to an overhanging extension of the center side rail. The pivotal mounting for the lower end of the balance link is slideably mounted in vertical ways, and adjusting means are provided for varying the position of this pivotal mounting to adjust the mechanism when necessary.

Still another object of this invention is to provide a foldable top structure for a motor vehicle unusually sturdy in construction, smooth and positive in operation, trouble free, and economical to manufacture and assemble.

Other objects and advantages of this invention will be made more apparent as this description proceeds, particularly when considered in connection with the accompanied drawings, wherein:

Figure 3 is a fragmentary top plan view of the structure shown in Figure 2, showing one side of the folding top construction.

Figure 4 is a side elevational view similar to Figure 2 but showing the folding top in an intermediate position between its raised and lowered positions.

Figure 5 is a view similar to Figures 2 and 4 but showing the folding top structure in its fully lowered position.

Figure 6 is an enlarged cross-sectional view taken on the line 6—6 of Figure 2.

Figure 1:
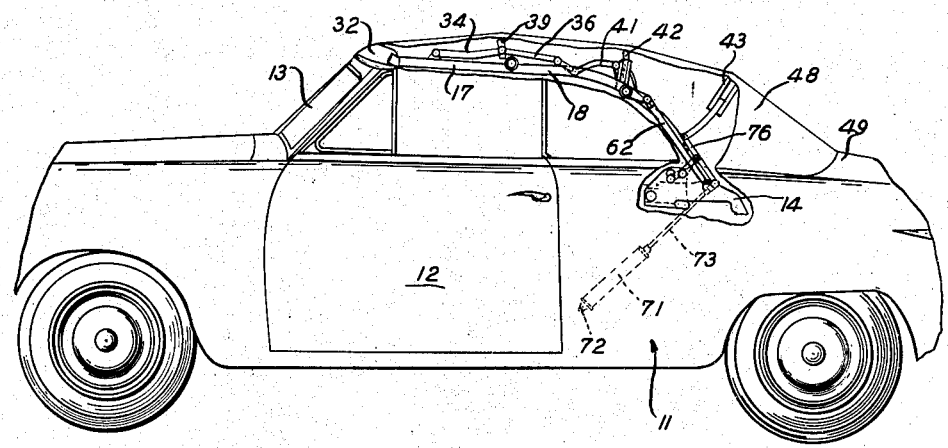
Figure 1 is a side elevation of part of a motor vehicle of the convertible type with portions of the body and top thereof broken away to show the foldable top construction.
Figure 2:
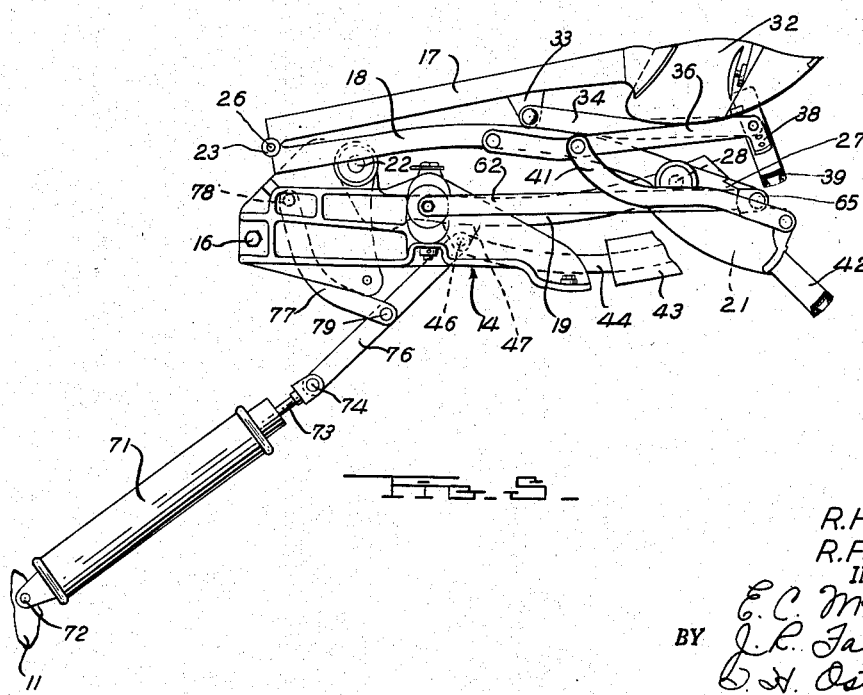
Figure 2 is an enlarged side elevational view similar to part of Figure 1 and showing the folding top structure in its raised position.

Referring now to the drawings, and particularly to Figure 1, the reference character 11 indicates a motor vehicle body of the convertible type and having a front door 12 and a windshield 13. Inasmuch as both sides of the folding top structure are identical, except for being reversed, only one side will be described in detail. Referring now to Figures 2 and 3 as well as Figure 1, a supporting bracket 14 is secured to the vehicle body 11 by bolts 16, the openings in the brackets for the bolts being enlarged to permit limited adjustment of the bracket on the body during assembly.

Three side rails are provided at each side of the top, these being the front side rail 17, the center side rail 18 and the rear side rail 19. While each of these side rails may be constructed in any desirable manner, in the present instance they comprise permanent mold aluminum castings and form a strong rigid structure. The rear side rail 19 is cast with integral flanges 20 and 21 extending laterally from opposite ends thereof, the lower flange 20 being pivotally connected to the upper portion of the supporting bracket 14 by means of a pivot pin 22.

The center side rail 18 is provided at its forward end with an integral bifurcation 23 embracing the tongue 24 formed on the rearward end of the front side rail 17, and pivotally connected thereto by means of a pivot pin 26. As best seen in Figure 2, the pivotal connection between the front and center side rails 17 and 18 is located adjacent the upper edges of the rails permitting the ends of the rail to abut each other directly beneath the pivotal connection when the top is in its raised position. At its rearward end the center side rail 18 is formed with an integral extension 27 laterally offset from the main body portion of the rail. The offset extension 27 is pivotally connected by means of a pivot pin 28 to the upper end of the rear side rail 19. The center and rear side rails 18 and 19 respectively are formed with abutting portions 29 and 31 respectively so that in the raised position of the top the main body portions of the three side rails are in alignment and form a continuous rail.

The front side rail 17 carries at its forward end a conventional header 32 adapted to engage and be secured to the frame of the windshield 13 when the top is raised. An integral upwardly extending flange 33 is formed on the front side rail 17 and forms a mounting for the forward end of a link 34, the rearward end of which is pivotally connected to a link 36. The link 36 is in turn pivotally connected at 37 to an intermediate portion of the center side rail 18. It will be noted that the link 36 is formed at its forward end with an upwardly extending flange 38 to which is secured a roof bow 39. The links 34 and 36 control the folding action of the front and center side rails 17 and 18 during the lowering of the top, the links being actuated during this operation by means of another link 41 having its forward end pivotally connected to an intermediate portion of the link 36 and its rearward end pivotally connected to the upper end of the forward flange 21 of the rear side rail 19.

A second roof bow 42 is connected to the flange 21 of the rear side rail, and a third roof bow 43 is connected to an arm 44 the lower end of which is pivotally connected by means of a pivot pin 46 to an integral upwardly extending flange 47 formed on an intermediate portion of the rear side rail 19. A suitable fabric top, showing in phantom by the reference character 48 in Figure 2, interconnects the header 32, the roof bows 39, 42 and 43, and the body panel 49 of the vehicle body.

Referring now to Figures 2 and 6, the supporting bracket 14, which may also comprise an aluminum casting, is formed with an elongated vertically extending opening or guideway 52. A pivot member 53 is mounted for sliding movement within the guideway 52. The pivot member 53 has a cylindrical center section 54 corresponding in diameter to the width of the guideway 52, an enlarged flange 56 arranged to engage one side of the bracket 14 and to overlap the lateral edges of the guideway and a pair of reduced extensions 57 and 58 extending from opposite sides of the pivot member. A retaining washer 59 encircles the extension 57 and is held thereon by means of a nut 61 screwed on the threaded end of the extension. The opposite extending end 58 of the pivot member forms a mounting for the lower end of a balance link 62, the latter being held thereon by means of a washer 63 and a stud 64. Momentarily referring to Figure 2, it will be noted that upper end of the balance link 62 is pivotally connected by means of a pin 65 to the rearward extremity of the integral extension 27 of the center side rail 18. The balance link 62 may be of solid construction or it may be in the form of a tube having flattened ends.

The center section 54 of the pivot member 53 is provided with a threaded bore 66 therethrough for the reception of an adjusting bolt 67. It will be noted the bolt 67 has a lower reduced portion 68 journaled in a hole formed in the bracket 14 and extending beyond the bottom wall thereof. A collar 69 is connected by a pin 70 to the extending portion of the adjusting bolt and it will be thus seen that the bolt is held against vertical movement but can be rotated to adjust the vertical position of the pivot member 53 within the guideway 52. This adjustment raises or lowers the lower end of the balance link 62, and since the head of the adjusting bolt 67 is located in a readily accessible position within the vehicle body, adjustment can be readily made not only during the initial assembly of the top but also at any time during subsequent operation. By proper adjustment of the adjusting bolt 67 to raise or lower the pivot member 53 for the balance link, the folding top structure can be adjusted to its optimum relationship.

The folding top of the present invention is designed for power operation by means of a hydraulic cylinder and piston assembly 71, although other power means can also be used. The lower end of the cylinder assembly 71 is pivotally connected at 72 to the vehicle body 11 at a point diagonally forwardly and downwardly from the supporting bracket 14. The piston rod 73 of the cylinder assembly 71 is pivotally connected at 74 to the lower end of a power link 76, the upper end of which is pivotally connected by means of the pin 46 to the upwardly extending flange 47 integrally formed on the rear side rail 19. A swinging strut 77 is provided between the fixed supporting bracket 14 and the power link 76, the lower end of the strut being pivotally connected to the bracket by means of the pivot pin 78, and the upper end of the strut being pivotally connected to an intermediate portion of the power link 76 by means of a pivot pin 79. It will be noted that the strut 77 is curved or bowed to provide clearance for the pivotal connection 22 between the rear side rail 19 and the bracket 14. For all practical purposes, however, it will be apparent that the strut 77 can be regarded as a straight strut extending between the pivots 78 and 79 at opposite ends thereof.

The strut 77 and the power link 76 form cooperating means through which the power of the cylinder and piston assembly 71 can be most advantageously applied to the folding top structure to swing the latter between its raised and lowered positions. The arrangement is such that an effective power application is applied throughout the entire cycle of the folding top. In the raised position of the top as shown in Figure 2, it will be seen that the power link 76 is substantially at right angles to the strut 77. During the initial power application in the lowering of the top from its raised position, the force is applied by the piston rod 73 in the direction of the arrow 81 substantially at right angles to the power link 76.

This power application results in swinging the power link 76 about the fulcrum provided by its pivotal connection 79 with the upper end of the strut 77, thus applying a turning couple or torque tending to swing the lower side rail 19 in a clockwise direction by reason of the connection of the upper end of the power link 76 to the bracket 47 on the side rail. Continued application of this force, through the interconnected side rails and the linkage, results in swinging the top structure to the position shown in Figure 4 substantially midway between the raised and lowered positions of the top. It will be noted that in this position the strut 77 has been swung downwardly from its initial position as shown in Figure 2, but still remains generally at right angle to the power link 76. The application of force through the connecting rod 73 is now in the direction of the arrow 82 and it will be noted that this force is applied to the rear side rail 19 through power link 76 as a combined turning and pulling force and results in swinging the rear side rail 19 in a clockwise direction about its pivotal connection to the bracket 14.

Figure 5 illustrates the position of the component parts of the top when the latter has been moved to its lowered position. It will be noted that in this position the strut 77 has been swung still further in a clockwise direction and that the power link 76 has assumed a position substantially in alignment with the power cylinder 71. As a result, the major portion of the force applied to the lower side rail 19 is by way of direct tension or compression of the power link 76 depending upon whether the top is being lowered or raised.

The application of power through the power link 76 cooperating with the swinging fulcrum strut 77 provides a simple yet effective control for the folding top. The power application and mechanical advantage of the construction is effective not only when the top is in its raised position but also during all portions of the cycle of top movement, and the geometrical arrangement of the linkage enhances the efficiency and smoothness of its operation.

It will be understood that the invention is not to be limited to the exact construction shown and described, but that various changes and modifications may be made without departing from the spirit and scope of the invention, as defined in the appended claims.

What is claimed is:

1. In a foldable top structure for a motor vehicle body, a rear side rail having its rearward end pivotally mounted upon said body and extending forwardly and upwardly from said pivotal mounting in the raised position of the top, a strut having one end pivotally mounted upon said body, a power link having one end pivotally connected to said rear side rail and an intermediate portion pivotally connected to the opposite end of said strut, said last-mentioned end of said strut forming a movable fulcrum for said power link, and power means operatively connected to the opposite end of said power link to actuate the latter and swing said rear side rail between its raised and lowered positions.

2. In a foldable top structure for a motor vehicle body, a supporting bracket mounted upon said vehicle body, a rear side rail having its rearward end pivotally mounted upon said bracket and extending forwardly and upwardly from said bracket in the raised position of the top, a strut having its lower end pivotally connected to said bracket and extending rearwardly and upwardly therefrom, a power link having its upper end pivotally connected to said rear side rail at a point located above the pivotal connection of said side rail to said bracket, said power link being pivotally connected intermediate its ends to the upper end of said strut, the upper end of said strut forming a movable fulcrum for said power link, and power means operatively connected to the lower end of said power link to swing the latter about its pivotal connection with said strut to swing said rear side rail between its raised and lowered positions.

3. In a foldable top structure for a motor vehicle body, a supporting bracket mounted upon said vehicle body, a rear side rail having its rearward end pivotally mounted upon said bracket and extending forwardly and upwardly from said bracket in the raised position of the top, a swinging strut having its lower end pivotally connected to said bracket and extending rearwardly and upwardly therefrom in the raised position of the top, a power link having its upper end pivotally connected to said rear side rail at a point spaced above the pivotal connection of said side rail to said bracket, said power link extending rearwardly and downwardly from its pivotal connection to said side rail and being substantially at right angles to said strut in the raised position of the top and being pivotally connected intermediate its ends to the upper end of said strut, the upper end of said strut forming a movable fulcrum for said power link; and power means operatively connected to the lower end of said power link and arranged to exert force upon said power link in a direction generally parallel to said fulcrum strut when the top is in its raised position to swing said power link about its pivotal connection with said strut and to swing said rear side rail between its raised and lowered positions.

4. In a foldable top structure for a motor vehicle body, a supporting bracket mounted upon said vehicle body, a rear side rail having its rearward end pivotally mounted upon said bracket and extending forwardly and upwardly from said bracket in the raised position of the top, a swinging fulcrum strut having its lower end pivotally connected to said supporting bracket at a point spaced downwardly and forwardly from the pivotal connection of said rear side rail to said bracket, said strut extending rearwardly and upwardly from its pivotal connection with said bracket in the raised position of the top, a power link extending generally at right angles to said strut in the raised position of the top and having its upper end pivotally connected to said rear side rail at a point located generally vertically above the pivotal connection of said side rail to said bracket and an intermediate portion pivotally connected to the upper end of said strut, a power cylinder supported upon said vehicle body and operatively connected to the lower end of said power link, said power cylinder being adapted to exert force upon said power link in a direction substantially at right angles to said link when the top is in its raised position and being effective to swing said power link about its pivotal connection with said strut and resulting in swinging said rear side rail from its raised position toward its lowered position.

5. In a foldable top structure for a motor vehicle body, a support mounted upon said vehicle body at one side thereof, a rear side rail having its lower end pivotally mounted upon said support and extending forwardly and upwardly therefrom in the raised position of the top, a second side rail extending generally horizontally in the raised position of the top and pivotally connected intermediate its ends to said rear side rail adjacent the upper end thereof, a balance link having its upper end pivotally connected to the rearward end of said second mentioned side rail and its lower end pivotally connected to said support at a point spaced rearwardly from the pivotal connection between said rear side rail and said support, a fulcrum strut pivotally connected to said support and extending rearwardly and upwardly therefrom in the raised position of the top, a power link pivotally connected intermediate its ends to the upper end of said strut and pivotally connected at its upper end to said rear side rail intermediate the ends of the latter, said last mentioned pivotal connection being generally vertically above the pivotal connection of said rear side rail with said support, and power means operatively connected to the opposite end of said power link for actuating the latter to move said side rails between their raised and lowered positions.

6. The structure defined in claim 5 which is further characterized in that said power link extends substantially at right angles to said fulcrum strut in the raised position of the top, and said power means is arranged to exert a force upon said power link in a direction substantially at right angles to said power link in the raised position of the top.

7. The structure defined by claim 5 which is further characterized in that said power means comprises a cylinder, piston and piston rod with the lower end of said cylinder being pivotally mounted upon said vehicle body and with the upper end of said piston rod being pivotally connected to said power link, said strut, power link and power means being so arranged that said power link is substantially at right angle to said strut both in the raised and lowered positions of the top and so that said piston rod is substantially at right angles to said power link in the raised position of the top and is generally in alignment with said power link in the lowered position of the top.

ROY HAWVER.
RICHARD F. VELTEN.

REFERENCES CITED

The following references are of record in the file of this patent:

UNITED STATES PATENTS

| Number | Name | Date |
|---|---|---|
| 2,221,460 | Simpson | Nov. 12, 1940 |
| 2,376,949 | Westrope | May 29, 1945 |
| 2,498,868 | Vigmostad | Feb. 28, 1950 |
| 2,540,454 | Milhan | Feb. 6, 1951 |

FOREIGN PATENTS

| Number | Country | Date |
|---|---|---|
| 452,958 | Great Britain | Sept. 2, 1936 |